US012509185B2

(12) United States Patent
Gosar et al.

(10) Patent No.: US 12,509,185 B2
(45) Date of Patent: Dec. 30, 2025

(54) WEEDLESS HYDROFOIL APPARATUSES FOR BOATS

(71) Applicant: Brunswick Corporation, Mettawa, IL (US)

(72) Inventors: Jimit J. Gosar, Aurora, IL (US); Trevor George, Savoy, IL (US)

(73) Assignee: Brunswick Corporation, Mettawa, IL (US)

(*) Notice: Subject to any disclaimer, the term of this patent is extended or adjusted under 35 U.S.C. 154(b) by 436 days.

(21) Appl. No.: 18/301,558

(22) Filed: Apr. 17, 2023

(65) Prior Publication Data
US 2024/0343347 A1    Oct. 17, 2024

(51) Int. Cl.
  *B63B 1/24*    (2020.01)
(52) U.S. Cl.
  CPC .............. *B63B 1/244* (2013.01); *B63B 1/242* (2013.01)
(58) Field of Classification Search
  CPC ................................. B63B 1/242; B63B 1/244
  See application file for complete search history.

(56) References Cited

U.S. PATENT DOCUMENTS

| | | |
|---|---|---|
| 2,054,374 A | 9/1936 | Fuller |
| 2,135,162 A | 11/1938 | Benson |
| 2,140,099 A | 12/1938 | Wise |
| 2,244,217 A | 6/1941 | Pries |
| 2,319,640 A | 5/1943 | Sink |
| 2,355,842 A | 8/1944 | Arado |
| 2,470,874 A | 5/1949 | Sidney |
| 2,894,477 A | 7/1959 | Brown |
| 3,025,825 A | 3/1962 | Martinson |
| 3,035,538 A | 5/1962 | Willard |
| 4,508,046 A | 4/1985 | Coulter et al. |
| 4,565,533 A | 1/1986 | Springer |
| 4,615,291 A | 10/1986 | Jones |
| 4,680,017 A | 7/1987 | Eller |
| 4,718,871 A | 1/1988 | Mendelelvitch |
| 4,925,412 A | 5/1990 | Karls |
| 5,619,944 A | 4/1997 | Baker |
| 6,234,098 B1 | 5/2001 | Biedenweg et al. |
| 6,302,042 B1 | 10/2001 | Biedenweg et al. |
| 6,937,983 B2 | 8/2005 | Romero |
| 9,233,732 B2 | 1/2016 | Wilson |
| 10,562,592 B2 | 2/2020 | Minor |
| 10,988,216 B1 | 4/2021 | Murphy |
| 11,091,234 B1 | 8/2021 | Rose et al. |
| 11,155,321 B2 | 10/2021 | Minor |

(Continued)

OTHER PUBLICATIONS

Candela C-7 (Year: 2023).*

(Continued)

*Primary Examiner* — Sabbir Hasan
(74) *Attorney, Agent, or Firm* — Andrus Intellectual Property Law, LLP (57) ABSTRACT

A boat for operation in water has a hull longitudinally extending between a bow and a stern and laterally extending between a port side and a starboard side, a hydrofoil suspended from the hull, wherein as the boat moves through the water the hydrofoil is configured to create a lifting force for lifting the hull upwardly out of water, and a weed deflector located between the hydrofoil and the bow, wherein the weed deflector is configured to deflect weeds away from the hydrofoil.

24 Claims, 11 Drawing Sheets

(56) References Cited

U.S. PATENT DOCUMENTS

| | | |
|---|---|---|
| 11,186,352 B1 | 11/2021 | Erickson et al. |
| 2005/0263059 A1 | 12/2005 | Earl, Jr. et al. |
| 2009/0031939 A1 | 2/2009 | Fishburn |
| 2012/0325135 A1 | 12/2012 | Ketterman et al. |
| 2017/0038771 A1 | 2/2017 | Green et al. |
| 2018/0050762 A1 | 2/2018 | Dombois |
| 2018/0304968 A1 | 10/2018 | Minor |
| 2020/0102052 A1 | 4/2020 | Geislinger et al. |
| 2020/0283098 A1 | 9/2020 | Minor |
| 2020/0391651 A1 | 12/2020 | Alexander et al. |

OTHER PUBLICATIONS

Bruno et al., Systems and Methods for Mitigation of Emergency Splashdown of Foiling Watercraft. Unpublished U.S. Appl. No. 17/586,122, filed Jan. 27, 2022.
Scherer et al., Pontoon Boats Having Lifting Foil Assemblies. Unpublished U.S. Appl. No. 18/079,562, filed Dec. 12, 2022.
Candela US website, last retrieved on Jan. 16, 2023. Accessed via https://candela.com/.

* cited by examiner

WEEDLESS HYDROFOIL APPARATUSES FOR BOATS

FIELD

The present disclosure relates to boats, and more particularly to hydrofoil configurations for boats.

BACKGROUND

Boats having hydrofoils are known in the art. The hydrofoils are typically a wing structure located under the hull of the boat. As boat speed increases the wing structure creates lift. That lift reduces wetted surface and drag. As speed further increases, the boat lifts entirely free of the water surface. Only the foil, or wing, remains in the water.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

In non-limiting examples disclosed herein, a boat configured for operation in water may include a hull longitudinally extending between a bow and a stern and laterally extending between a port side and a starboard side, a hydrofoil suspended from the hull, wherein as the boat moves through the water the hydrofoil is configured to create a lifting force for lifting the hull upwardly out of water, and a weed deflector located between the hydrofoil and the bow, wherein the weed deflector is configured to deflect weeds away from the hydrofoil.

In some examples, the hydrofoil may include a lifting member configured to create the lifting force, the lifting member having a port wing which laterally extends relative to the port side of the hull and a starboard wing which is opposite the port wing and which laterally extends relative to the starboard side of the hull. The lifting member may include a forward edge which is curved from the port wing to the starboard wing, and/or the lifting member may include a forward edge which is straight from the port wing to the starboard wing. The weed deflector may be between the hydrofoil and the bow, and/or the weed deflector may be between the port wing and the starboard wing. Additionally or alternatively, the weed deflector may have a first end coupled to the bow, a second end which is opposite the first end, and a body which extends downwardly from the hull towards the lifting member.

In some examples, the weed deflector may be a first weed deflector, and the boat may further comprise a second weed deflector located between the hydrofoil and the bow, wherein the second weed deflector is configured to deflect weeds away from the hydrofoil, and further wherein the second weed deflector has a first end coupled to the bow, a second end which is opposite the first end, and a body which extends downwardly from the hull towards the lifting member.

In some examples, the body may be a straight member extending from the first end to the second end, wherein the second end may be coupled to the lifting member, and/or the second end may be separate from the lifting member. The body may be a curved member extending downwardly from the hull and then rearwardly to the second end, wherein the second end may be coupled to the lifting member and/or the second end may be separate from the lifting member.

In some examples, the hydrofoil may further comprise a strut which couples the lifting member to the hull. The weed deflector may have a first end coupled to the bow, a second end which is opposite the first end, and a body which extends downwardly from the hull towards the lifting member. The second end of the weed deflector may be coupled to a forward edge of the lifting member, the second end of the weed deflector may be coupled to the strut above the lifting member, and/or the second end of the weed deflector may be coupled to a bottom surface of the lifting member. The strut may have a first end coupled to the hull, a second end which is opposite the first end and is coupled to the lifting member, and a body which extends from the first end to the second end. The strut may be a first strut, and the boat may further comprise a second strut having a first end coupled to the hull, a second end which is opposite the first end and is coupled to the lifting member, and a body which extends from the first end to the second end. Additionally or alternatively, a propulsor may be coupled to the second end of the strut.

In some examples, the hydrofoil may be movable relative to the hull into and between an extended position and a retracted position. Additionally or alternatively, the weed deflector may be movable relative to the hull into and between an extended position and a retracted position.

In non-limiting examples disclosed herein, a boat is for operation in water, the boat having a hull longitudinally extending between a bow and a stern and laterally extending between a port side and a starboard side, a hydrofoil suspended from the hull, wherein as the boat moves through the water, the hydrofoil is configured to create a lifting force for lifting the hull upwardly out of water, and a weed deflector located between the hydrofoil and the bow, wherein the weed deflector is configured to deflect weeds away from the hydrofoil.

BRIEF DESCRIPTION

The present disclosure includes the following Figures.

DETAILED DESCRIPTION OF THE DRAWINGS

During research and development in the field of marine vessels, the present inventors determined that hydrofoils may collect weeds where the foil and a strut supporting the foil interface. As weeds collect on the hydrofoil, the drag on the marine vessel increases, which may affect the performance of the marine vessel. Weeds may also get caught in the propulsion device, interfere with propulsion waterflow, and/or reduces the lift generated by the hydrofoil, which can also affect the performance of the marine vessel. Through research and experimentation, the present inventors determined it would be advantageous to provide a hydrofoil that deflects weeds away from the hydrofoil to prevent them from collecting thereon. The present disclosure is a result of the present inventors' efforts in this regard.

FIGS. 1-10 illustrate embodiments of a boat 80 that include at least one hydrofoil 102, 104, 106 suspended from a hull 82 of the boat 80 and at least one weed deflector 110, 112, 114 configured to prevent weeds from accumulating on the hydrofoils 102, 104 as the boat 80 moves through the water. The hull 82 of the boat 80 extends from top to bottom in an axial direction AX, from bow 84 to stern 86 in a longitudinal direction LO which is perpendicular to the axial direction AX, and from a port side 88 to an opposite starboard side 90 in a lateral direction LA which is perpendicular to the axial direction AX and perpendicular to the longitudinal direction LO. An outboard marine drive 108 mounted at the stern of the boat 80 is configured to generate a thrust force to propel the boat 80 through the body of water in which the boat 80 is situated. As the boat 80 moves through the water, the hydrofoils 102, 104, 106 are configured to create a lifting force for lifting the hull 82 upwardly out of water and the weed deflectors 110, 112, 114 are configured to deflect weeds away from the hydrofoils 102, 104, 106.

FIGS. 1-10 illustrate embodiments of a hydrofoil 102, 104, 106 and a weed deflector 112, 114, 116 suspended from the hull 82 of a boat 80. However, embodiments of a hydrofoil 102, 104, 106 and/or a weed deflector 112, 114, 116 (such as those of FIGS. 1-13) may be used with other types of powered and/or unpowered marine vessels. For example, at least one hydrofoil and/or at least one weed deflector may use with manually powered watercraft (e.g., canoes, kayaks, paddleboats, etc.), engine powered watercraft, sail boats, monohulls, multihulls, surfboards, paddleboards, wake boards, water skis, personal watercraft (e.g., jet skis), commercial watercraft, military watercraft, recreational watercraft, submersible watercraft, and/or any other type of manned or unmanned watercraft configured to travel through water.

Figure 1:
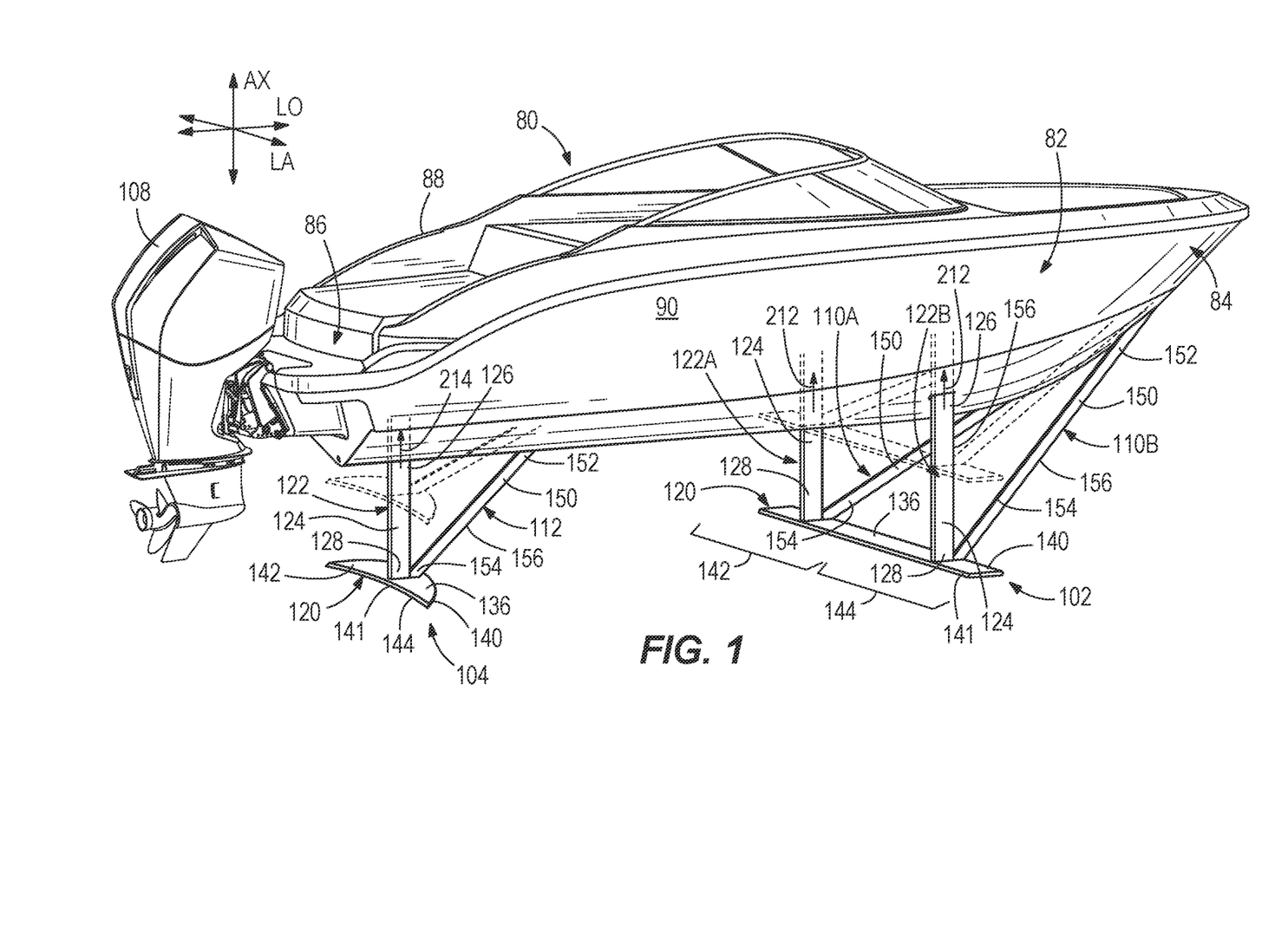
FIG. 1 is a perspective view of a boat having a first embodiment of a weedless hydrofoil apparatus.

Referring to FIG. 1, the illustrated boat 80 includes a forward hydrofoil 102 positioned towards the bow 84 and an aft hydrofoil 104 positioned longitudinally behind the forward hydrofoil 102 towards the stern 86. Each hydrofoil 102, 104 includes a lifting member 120 (i.e., a foil) configured to create a lifting force as the water flows around the lifting member 120 (for example as the result of Bernoulli effect and/or the downward deflection of water by the lifting member 120), and a strut 122 that couples the lifting member 120 to the boat hull 82. Each strut 122 has a body 124 that extends vertically from a first end 126 coupled to the hull 82 to a second end 128 coupled to one of the lifting members 120. In some embodiments, an outer surface 130 of the struts 122 may be shaped to reduce drag forces exerted on the struts 122 as they move through the water. For example, the body 124 of the struts 122 may have streamlined outer surface 130 to reduce form drag and/or skin drag.

In the embodiment of FIG. 1, the lifting member 120 of the forward hydrofoil 102 is coupled to the hull 82 by two struts 122 (a port side strut 122A and a starboard side strut 122B), and the aft hydrofoil 104 is supported by a single strut 122. The port and starboard side struts 122A, 122B of the forward hydrofoil 102 extend downward from the respective port and starboard sides 88, 90 of the hull 82, and the strut 122 of the aft hydrofoil 104 is positioned along the centerline of the boat 80. Some embodiments, however, may have a different strut configuration in which at least one of the forward hydrofoil 102 and the aft hydrofoil 104 has a lifting member 120 that is supported by a different number of struts than the embodiment of FIG. 1. For example, a boat 80 may include forward hydrofoil 102 that has only one strut 122 (see, e.g., FIG. 2) or more than 2 struts and/or an aft hydrofoil 104 with more than one strut 122. Further still, some embodiments may include a forward and/or aft hydrofoil 102, 104 that is not supported by a strut (sec, e.g., FIGS. 3, 5-7, and 9).

With continued reference to FIG. 1, the lifting members 120 of the forward and aft hydrofoils 102, 102 are suspended below the hull 82 from the corresponding strut(s) 122 and each have a longitudinally extending body 134 with an upper surface 136, a lower surface 138 (sec, e.g., FIGS. 11-13), a forward edge 140 at the front of the body 134 facing towards the bow 84 of the boat 80, and a trailing edge 141 facing towards the stern 86 of the boat 80. The body 134 of each lifting member 120 generally includes a port wing section 142, which laterally extends relative to the port side 88 of the hull 82, and a starboard wing section 144, which is opposite the port wing section 142 and laterally extends relative to the starboard side 90 of the hull 82. The port wing section 142 and the starboard wing section 144 are joined proximate the centerline of the boat 80. In the embodiment of FIG. 1, the bodies 134 of the lifting members 120 are unitary bodies with port and starboard wing sections 142, 144 are joined proximate the centerline of the boat 80. Other embodiments, however, may include a lifting member with separate port and starboard wing sections 142, 144.

Figure 2:
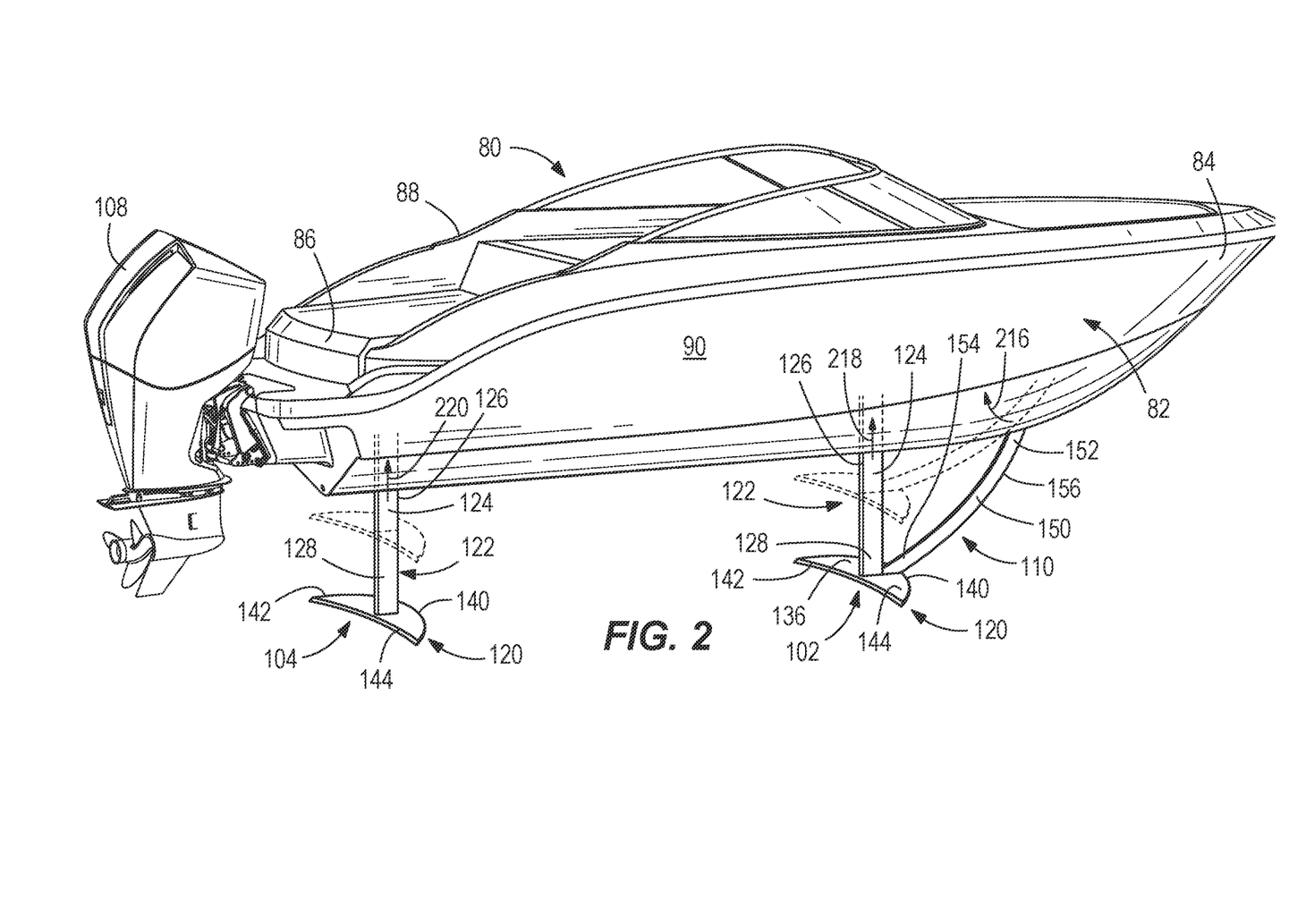
FIG. 2 is a perspective view of a boat having a second embodiment of a weedless hydrofoil apparatus.
Figure 3:
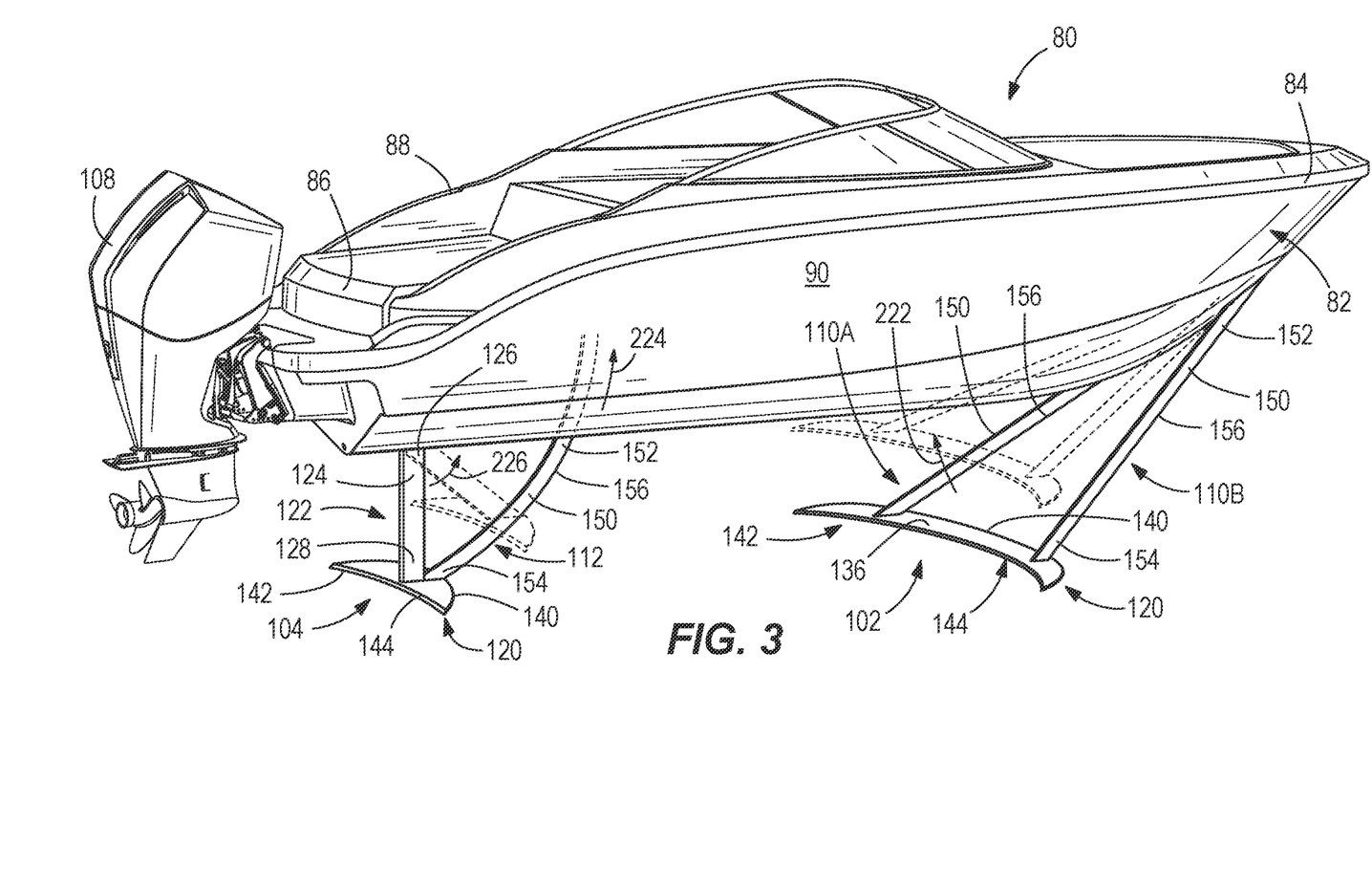
FIG. 3 is a perspective view of a boat having a third embodiment of a weedless hydrofoil apparatus.

The shape of each lifting member 120 may be based on at least one of the desired lift force for the lifting member 120, the hydrodynamic drag experienced by the lifting member 120, the desired performance characteristics of the boat, and any other factors. In the embodiment of FIG. 1, the forward hydrofoil 102 has a forward edge 140 and a trailing edge 141 that are straight between the port wing section 142 and the starboard wing section 144. The aft hydrofoil 104 a forward edge 140 and a trailing edge 141 that are curved between the port wing section 142 and the starboard wing section 144 in a swept back design. Other embodiments, however, may be differently configured. For example, as illustrated in FIGS. 2-3, the lifting members 120 of the forward and aft hydrofoils 102, 104 both include forwards edges 140 that are curved in a swept back design. Some embodiments may be configured with an aft hydrofoil that includes a lifting member with a forward edge that is straight. In the illustrated embodiments, the lifting members 120 are generally planar. Some embodiments, however, may include at least one lifting member with port and starboard wing sections 142, 144 that are angled upwards relative to each other in a dihedral configuration or downwards relative to each other in an anhedral configuration.

As previously mentioned, embodiments of a boat 80 may include a novel weed deflector configured to deflect weeds away from the hydrofoil(s). For example, as illustrated in FIG. 1, the boat 80 includes two forward weed deflectors 110 and an aft weed deflector 112 configured to prevent weeds from collecting on the forward and aft hydrofoils 102, 104, respectively. Each weed deflector 110, 112 extends downward from the hull 82 of the boat 80 and is positioned between a corresponding one of the hydrofoils 102, 104 and the bow 84 (i.e., in front of the corresponding hydrofoil 102, 104). The weed deflectors 110, 112 each have a first end 152 coupled to the bow 84, a second end 154 opposite the first end 152, and a body 150 that extends downwardly and rearwardly from the first end 152 at the hull 82 towards the lifting member 120.

The forward weed deflectors 110 are configured as a port side forward weed deflector 110A and a starboard side weed deflector 110B with first ends 152 that are coupled to the respective port and starboard sides 88, 90 of the hull 82 in front of the first ends 126 of the port and starboard struts 122A, 122B. The aft weed deflector 112 has a first end 152 that is coupled to the bottom of the hull 82 along the centerline and in front of the first end of the strut 122 of the aft hydrofoil 104. The bodies 150 of the forward and aft weed deflectors 110, 112 are configured as straight members that extends downward and rearward from their first ends 152 to their second ends 154, which are coupled to the upper surface 136 of the corresponding lifting member 120. The second ends 154 of the port and starboards forward weed deflectors 110A, 110B are coupled to the forward lifting member 120 in front of the second ends 128 of the port and starboard struts 122A, 122B, respectively. The second end of the aft weed deflector 112 is coupled to the aft lifting member 120 in front of the second end 128 of the strut 122 of the aft hydrofoil 104 and between the port wing section 142 and the starboard wing section 144 of the lifting member 120. Advantageously, aligning the weed deflectors 110, 112 in front of the struts 122 reduces the drag force experienced by the hydrofoils 102, 104 as the struts 122 are positioned in the wake of the weed deflectors 110, 112.

As the boat 80 is propelled forward through the water, weeds that are in the water in front of the hydrofoils 102, 104 make contact with and collect on a leading edge 156 of the forward weed deflectors 110 or the aft weed deflector 112. Continued forward motion of the boat 80 causes weeds collecting on the weed deflectors 110, 112 to slide down along the swept back leading edges 156 of the weed deflectors 110, 112 until the weeds slide off the bottom of the weed deflectors 110, 112 below the lifting members 120. Thus, the weed deflectors 110, 112 deflect weeds downward and away from the forward and aft hydrofoils 102, 104. By positioning the weed deflectors 110, 112 in front of the struts 122 of the hydrofoils 102, 104, the weed deflectors 110, 112 prevent weeds from getting caught at the joint between the struts 122 and the lifting members 120.

Figure 6:
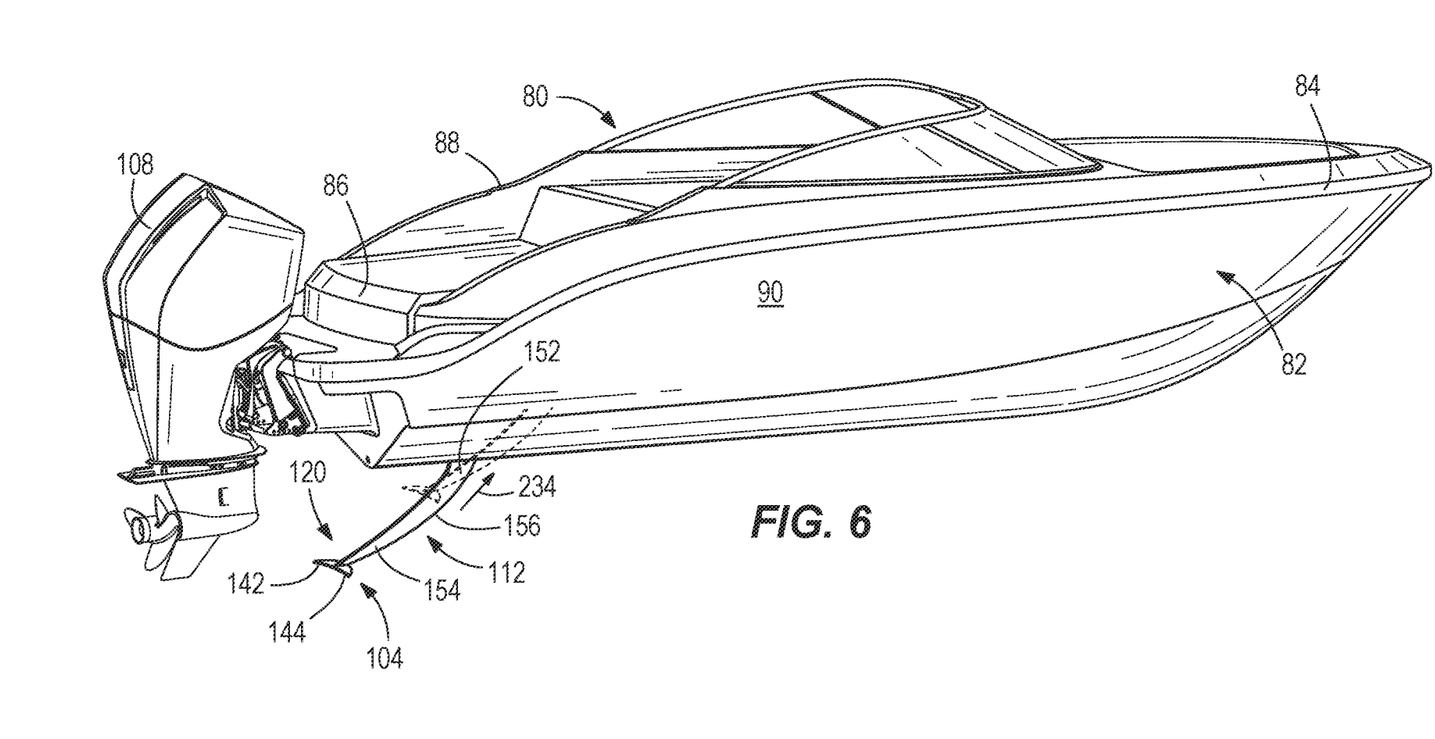
FIG. 6 is a perspective view of a boat having a sixth embodiment of a weedless hydrofoil apparatus.

While the embodiment of FIG. 1 includes two forward weed deflectors 110 and one aft weed deflector 112, some embodiments may include a different number of weed deflectors. In FIG. 2, for example, the boat 80 is configured with a single forward weed deflector 110 and no aft weed deflector. Some embodiments of a boat 80 may not include a forward hydrofoil 102 or an aft hydrofoil 104. In such an embodiment, the boat 80 would correspondingly omit the forward weed deflector 110 or the aft weed deflector 112. In FIG. 6, for example, the illustrated boat 80 omits a forward hydrofoil and weed deflector and includes an aft hydrofoil 104 with a lifting member 120 that is suspended from a curved aft weed deflector 112.

Some embodiments may include at least one weed deflector that is configured differently than the weed deflectors 110, 112 of FIG. 1. For example, FIG. 2 illustrates an embodiment of a boat 80 that includes a forward weed deflector 110 with a body 150 configured as a curved member. FIG. 3 illustrates an embodiment of a boat 80 including forward weed deflectors 110 with a straight bodies and an aft weed deflector 112 with a curved body 150. The curved body 150 of the aft weed deflector 112 extends downwardly from a first end 152 at the hull 82 and then rearwardly to the second end 154 of the weed deflector 112. As with the weed deflectors of FIG. 1, the leading edge 156 of the curved body 150 is configured to deflect weeds downward and away from the lifting members 120 so that the weed do not accumulate of the hydrofoils 102, 104.

In some embodiments, a boat 80 may include a hydrofoil with at least one lifting member 120 that is supported on the hull 82 of the boat 80 by the weed deflectors 110, 112 without struts. For example, referring to FIG. 3, the boat 80 includes a forward hydrofoil 102 with a lifting member 120 that is suspended from the hull 82 of the boat 80 by two forward weed deflectors 110. Each of the forward weed deflectors 110 extends downward and rearwardly from a first end 152 coupled to the bow 84 of the boat 80 to a second end 154 coupled to the lifting member 120. By omitting at least one of the struts, the total weight of boat 80 is reduced, which advantageously may lead to performance improvements. Additionally or alternatively, as illustrated in FIG. 6, some embodiments may include an aft hydrofoil 104 with a lifting member 120 that is supported by at least one aft weed deflector 112 without a strut.

Figure 4:
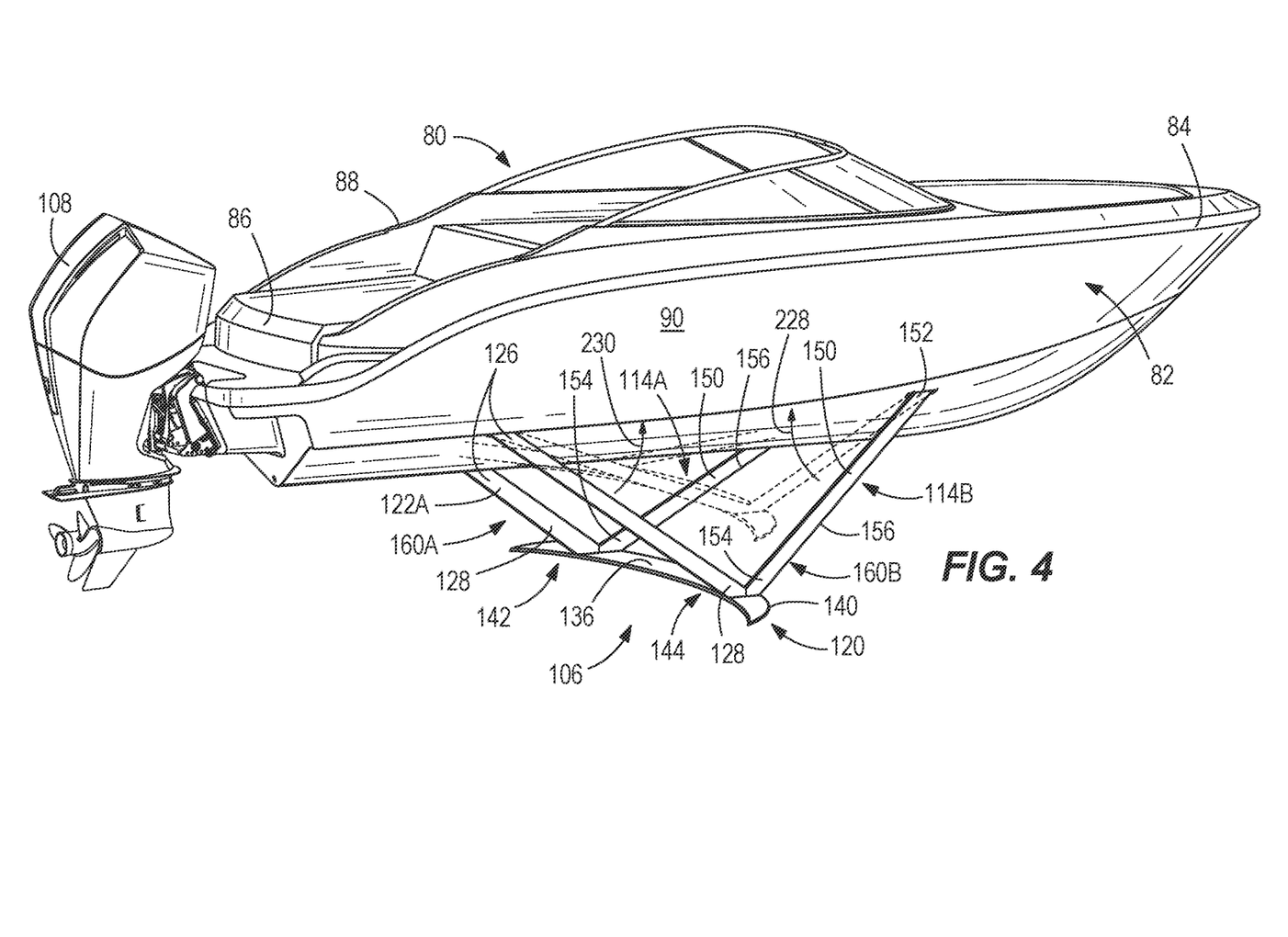
FIG. 4 is a perspective view of a boat having a fourth embodiment of a weedless hydrofoil apparatus.
Figure 5:
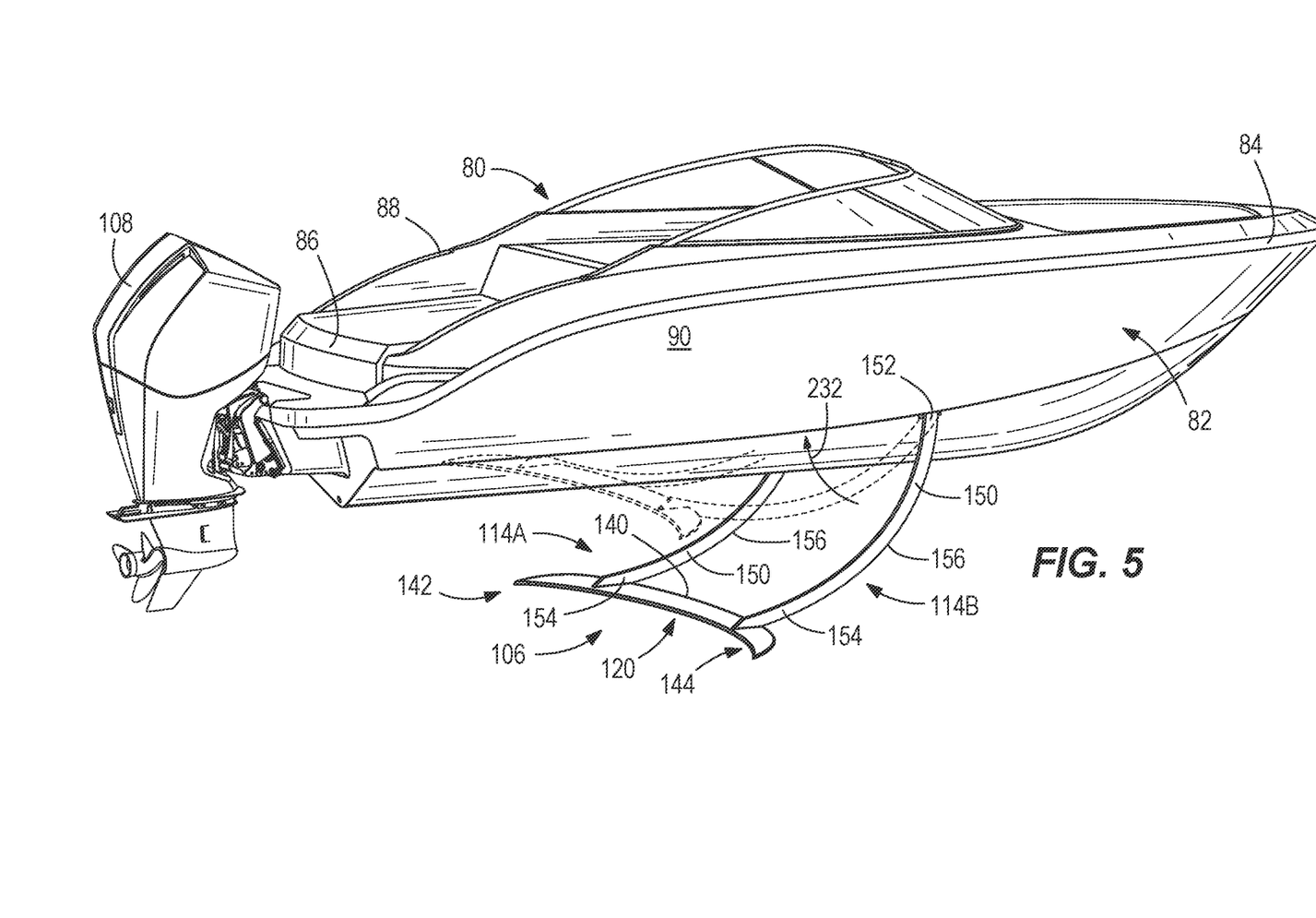
FIG. 5 is a perspective view of a boat having a fifth embodiment of a weedless hydrofoil apparatus.

Some embodiments of a boat 80 may be configured with a hydrofoil and corresponding weed deflector(s) at a different location on the boat 80. For example, FIGS. 4 and 5 illustrate embodiments that include a midship hydrofoil 106 positioned proximate the longitudinal center of the boat 80 (i.e., midship). In the embodiment of FIG. 4, the lifting member 120 of midship hydrofoil 106 is supported by two generally "V" shaped support structures 160 that each include a strut 122 and a generally straight midship weed deflector 114. In particular, a port side supporting structure 160A includes the port side strut 122a and the port side midship weed deflector 114A. The port side strut 122A that extends downwardly and forwardly from a first strut end 126 coupled to the port side 88 of the hull 82 to a second strut end 128 coupled to the upper surface 136 of the lifting member 120. The port side midship weed deflector 114A that extends downwardly and rearwardly from a first end 152 coupled to the port side 88 of the hull 82 to a second end 154 coupled to the upper surface 136 of the lifting member 120 and the second end 128 of the port side strut 122A. Similarly, the starboard side supporting structure 160B includes a starboard side strut 122B that extends downwardly and forwardly the starboard side 90 of the hull 82 the upper surface 136 of the lifting member 120 and a starboard side midship weed deflector 114B that extends downwardly and rearwardly the port side 88 of the hull 82 to the upper surface 136 of the lifting member 120 and the second end 128 of the starboard side strut 122B. FIG. 5 illustrates an embodiment of a boat 80 that includes a midship hydrofoil 106 with a lifting member 120 that is suspended form the hull 82 by a curved port side midship weed deflector 114A and a curved starboard side midship weed deflector 114B.

Some embodiments of a boat may include a hydrofoil that is integrated with a marine drive. Referring to FIGS. 7-10, a boat 80 may be configured with a marine drive 162 that has an integrated propulsor hydrofoil 164. The marine drive 162 includes a strut 166 that extends downwardly from a first end 168 at the stern 86 of the boat 80 to a second end 170 that supports a propulsor 172 below the hull 82. The lifting member 165 of the propulsor hydrofoil 164 includes a port wing section 174 that extends laterally from the port side of the propulsor 172 and the strut 166 and a starboard wing section 176 that extends laterally from the starboard side of the propulsor 172 and the strut 166. Additionally or alternatively, some embodiments may include a propulsor that is connected to a forward hydrofoil 102 or an aft hydrofoil 104. For example, a propulsor may be positioned at the second end of a strut 122 supporting the lifting member 120 of the forward hydrofoil 102 or the aft hydrofoil 104. Referring to FIG. 8, some embodiments may include a propulsor weed deflector 180 configured to deflect weeds away from the propulsor 172 and the propulsor hydrofoil 164. The illustrated propulsor weed deflector 180 has a curved body 182 that extends from downwardly a first end 184, which may be coupled to the hull 82, to a second end 186 which may be coupled to the propulsor 172, the lifting member 165, and/or the second end of the strut 166.

Figure 9:
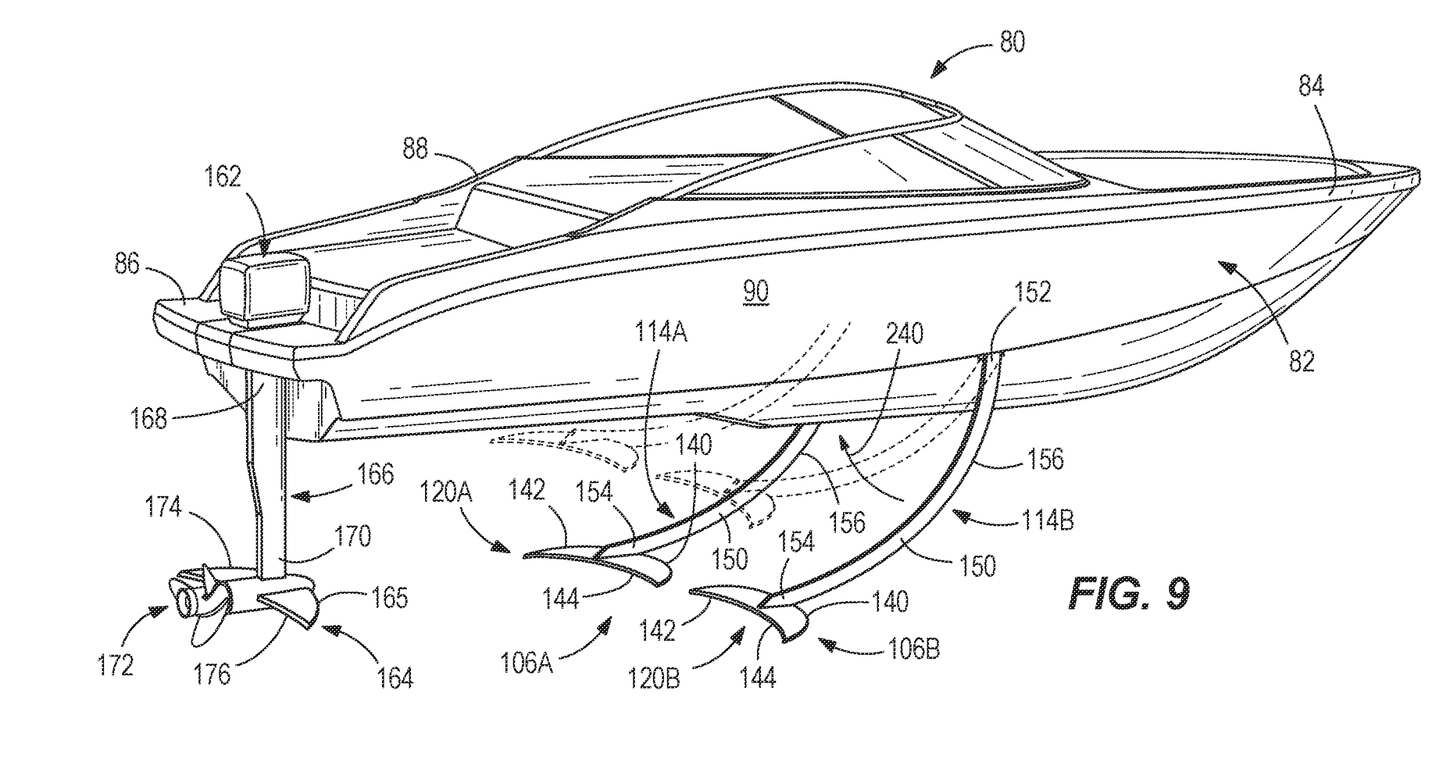
FIG. 9 is a perspective view of a boat having a ninth embodiment of a weedless hydrofoil apparatus.

Some embodiments of a boat may include multiple hydrofoils at the bow, stern, and/or midship position(s). As illustrated in FIG. 9, for example, a boat 80 may be configured with a port side midship hydrofoil 106A and a starboard side midship hydrofoil 106B. The port and starboard midship hydrofoils 106A, 106B respectively include port and starboard lifting members 120A, 120B that are suspended from the hull 82 by port and starboard side weed deflectors 114A, 114B. Each lifting member 120A, 120B is coupled to the second end 154 of the one of the weed deflectors 114A, 114B and include a port wing section 142 that extends laterally in the direction of the port side 88 of the hull 82 and a starboard wing section 144 that extends laterally in the direction of the starboard side 90 of the hull 82.

Figure 10:
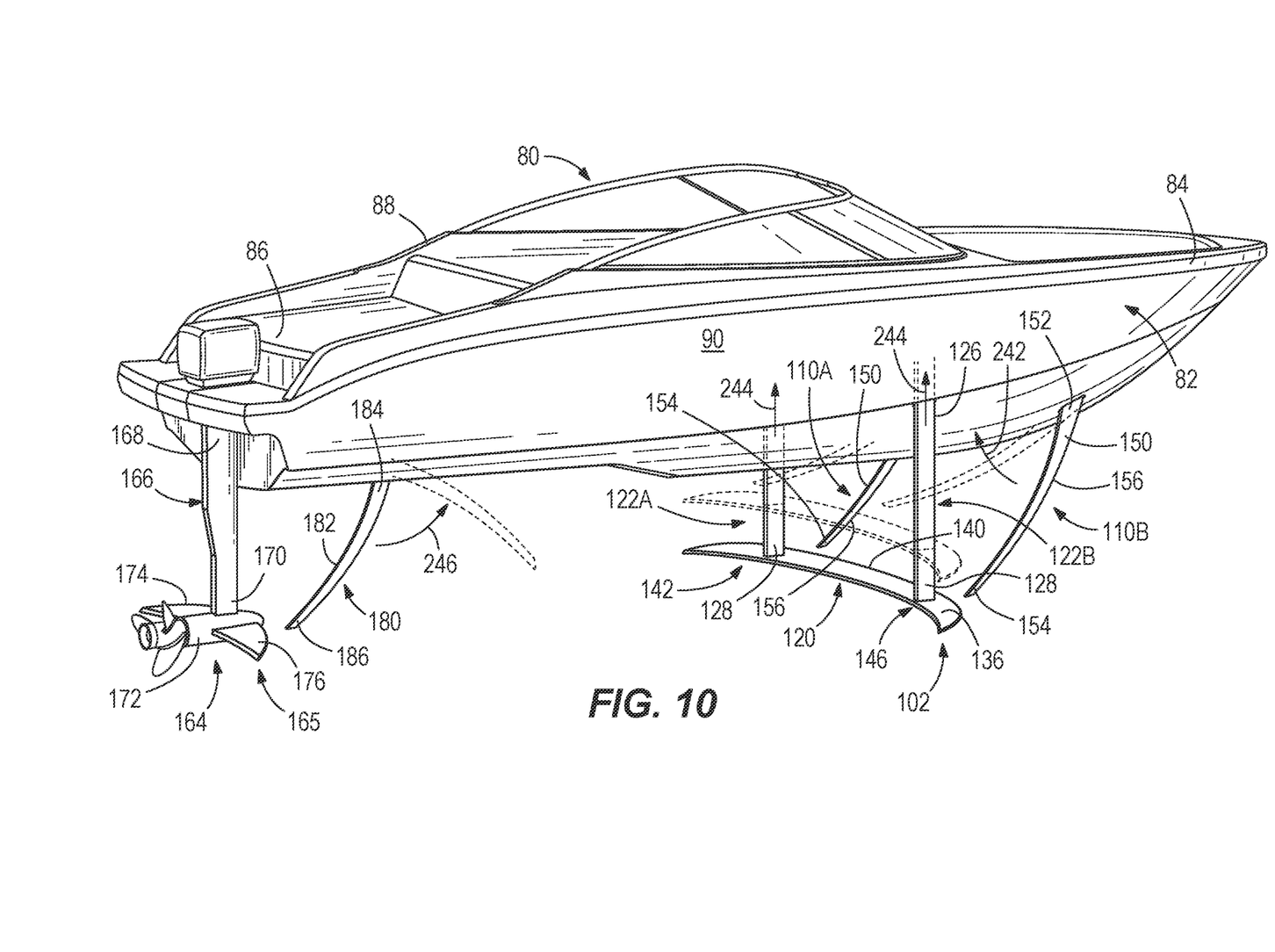
FIG. 10 is a perspective view of a boat having a tenth embodiment of a weedless hydrofoil apparatus.
Figure 11:
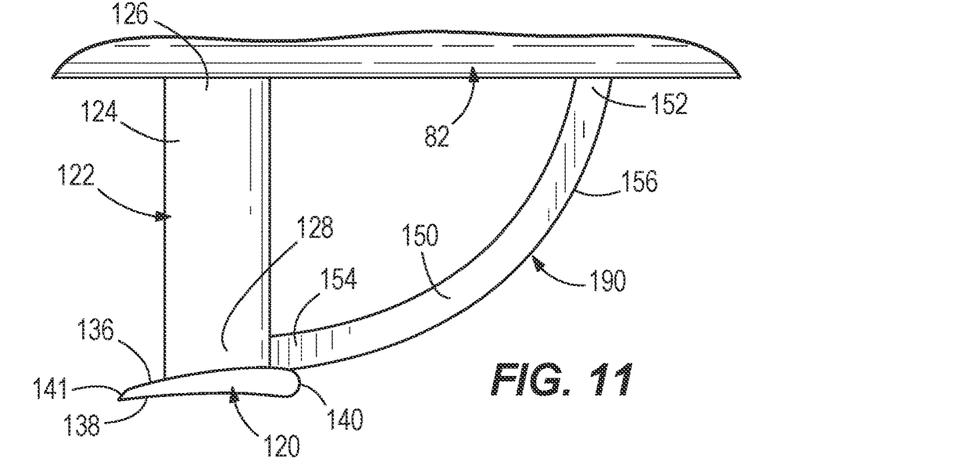
FIG. 11 is a side view of an eleventh embodiment of a weedless hydrofoil apparatus.

In the embodiments of FIGS. 1-9, the lifting members 120 of the forward, aft, and midship hydrofoils 102, 104, 106 are supported by a strut 122 and/or corresponding weed deflector 110, 112, 114 that is coupled to an upper surface 136 of the lifting member 120. However, other embodiments may be differently configured. FIG. 10 illustrates an embodiment of a boat 80 including a forward hydrofoil 102, a propulsor hydrofoil 164, and forward and propulsor weed deflectors 110, 180 that are not connected to the lifting members 120 of the hydrofoils 102, 164. Each weed deflector 110, 180 extends downwardly from a first end 152, 184 secured to the hull 82 of the boat 80 to an opposite second end 154, 186 that is separate from the lifting members 120, 165 of the hydrofoils 102, 164. Weeds which are caught on the weed deflectors 110, 180 are deflected downwards such that the weeds fall off the second end 154, 186 below the lifting members 120, 165, thereby preventing the weeds from collecting on the hydrofoils 102, 164.

Figure 12:
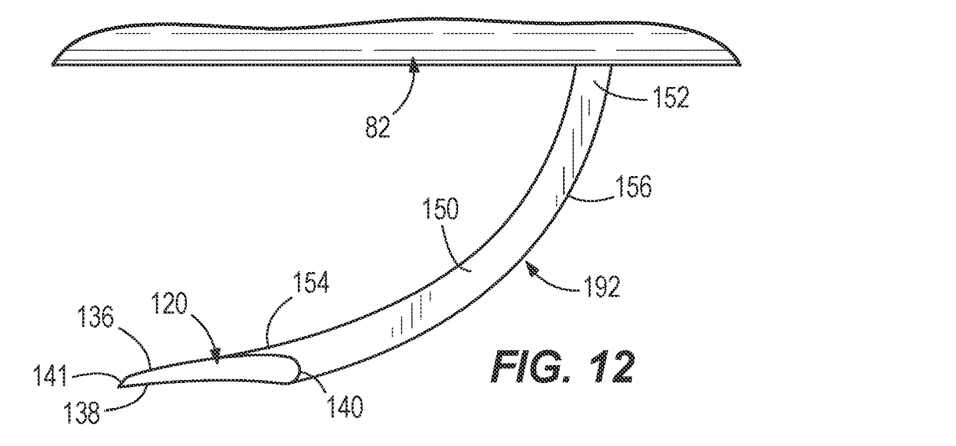
FIG. 12 is a side view of a twelfth embodiment of a weedless hydrofoil apparatus.
Figure 13:
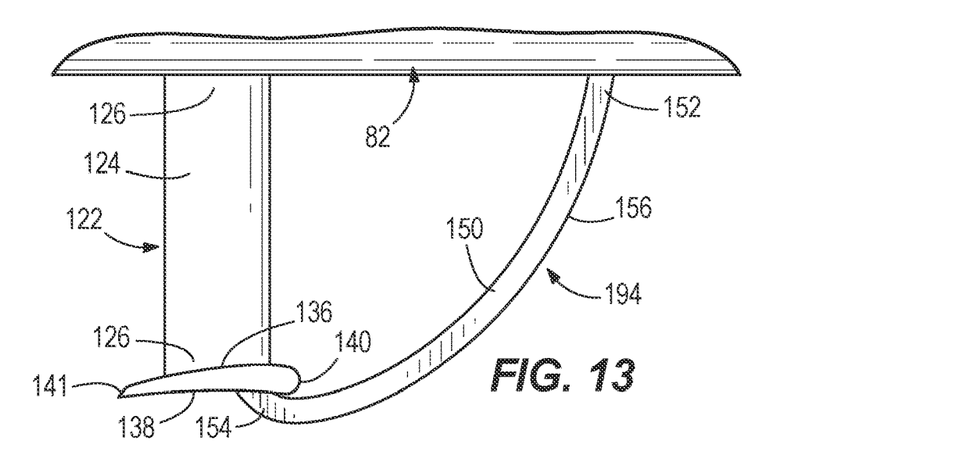
FIG. 13 is a side view of a thirteenth embodiment of a weedless hydrofoil apparatus.

Further still, some embodiments of a weed deflector may be configured with second ends that are coupled to different parts of a hydrofoil. For example, referring to FIG. 11, embodiments of a weed deflector 190 may be configured with a curved body 150 that extends downward from a first end 152 coupled to the hull 82 of the boat 80 to a second end 154 that is coupled to the second end 128 of the strut 122 above the lifting member 120. FIG. 12 illustrates an embodiment of a weed deflector 192 with a curved body 150 that extends downward from a first end 152 coupled to the hull 82 of the boat 80 to a second end 154 that is coupled to the forward edge 140 of the lifting member 120. FIG. 13 illustrated an embodiment of a weed deflector 194 with a second end 154 that is coupled to the bottom surface 138 of the lifting member 120. The body 150 of the weed deflector 194 extends downward and rearwardly from a first end 152 coupled to the boat hull 82 to an opposite second end 154. The second end 154 of the weed deflector 194 continues in a rearward direction and curves upward to connect to the bottom surface 138 of the lifting member 120.

Some embodiments of a hydrofoil and/or weed deflector may be configured as a retractable hydrofoil and or weed deflector movable into and between an extended position and a retracted position. For example, in the embodiments of FIGS. 1-10, at least one of the hydrofoils 102, 104, 106 and/or the weed deflectors 110, 112, 114, 180 may be configured as a retractable hydrofoil and/or weed deflector 110, 112, 114, 180 that can be moved between extended positions (depicted in solid lines) and retracted positions (depicted in dashed lines). Retractable hydrofoils and/or weed deflectors may be useful, for example, in order to stow the hydrofoils 102, 104, 106 and/or the weed deflectors 110, 112, 114, 180 when storing the boat 80 in or out of the water, operating the boat 80 in shallow water, to avoid collisions between the hydrofoils 102, 104, 106 and/or weed deflectors 110, 112, 114, 180 and an object in the water, and/or in other situations in which use of the hydrofoils 102, 104, 106 and/or weed deflectors 110, 112, 114, 180 is not desired. In some embodiments, the boat 80 may include a motor or other actuator configured to move the retractable hydrofoils 102, 104, 106 and/or weed deflectors 110, 112, 114, 180 between the extended and retracted positions. Other embodiments, however, may be configured for manual movement of the hydrofoils 102, 104, 106 and/or weed deflectors 110, 112, 114, 180 between the extended and retracted positions.

Referring to FIG. 1, the illustrated boat 80 includes a retractable forward hydrofoil 102 with retractable forward weed deflectors 110 and a retractable aft hydrofoil 104 with a retractable aft weed deflector 112. The forward and aft hydrofoils 102, 104 are configured to transition from their extended positions to their retracted positions by sliding upwards in the direction of the respective arrow(s) 212, 214. As the forward hydrofoil 102 moves from the extended position to the retracted position, the struts 122 supporting the lifting member 120 may retract upwards in the direction of arrows 212 into a recess, slot and/or other space within the hull 82. Other embodiments may move the lifting member 120 upwards using a collapsible, telescoping strut and/or another mechanism for upwards movement. As the forward hydrofoil 102 moves upwards, the forward weed deflectors 110 may move with the forward hydrofoil 102 by pivoting, sliding, and/or otherwise moving relative to the hull 82. In the illustrated embodiment, the forward lifting member 120 pivots relative to the second ends 154 of the weed deflectors 110 to maintain a generally horizontal orientation. Other embodiments, however, may include a forward lifting member 120 that is rigidly connected to at least one of the forward weed deflectors 110 or which does not pivot relative to the second ends 154 of the weed deflectors 110. A portion of each forward weed deflector 110 is retracted into the hull 82; collapsed, telescopically or otherwise; and/or otherwise shortened to accommodate upward movement of the forward hydrofoil 102, which decreases the distance between the lifting member 120 and the connection point between the hull 82 and the first end 152 of the forward weed deflector 110.

With continued reference to FIG. 1, the aft hydrofoil 104 is configured to move from the extended position to the retracted position similarly to the movement of the forward hydrofoil 102. As the aft hydrofoil 104 moves from the extended position to the retracted position, the strut 122 supporting the lifting member 120 may retract upwards into a recess, slot and/or other space within the hull 82 in the direction of arrows 214. Other embodiments may move the lifting member 120 upwards using a collapsible, telescoping strut and/or another mechanism for upwards movement. As the aft hydrofoil 104 moves upwards, the aft weed deflector 112 may move with the aft hydrofoil 104 by pivoting, sliding, and/or otherwise moving relative to the hull 82. In the illustrated embodiment, the first end 152 of the aft weed deflector 112 pivots relative to the hull 82. The aft lifting member 120 pivots relative to the second end 154 of the weed deflectors 112 to maintain a generally horizontal orientation. Other embodiments, however, may include an aft lifting member 120 that is rigidly connected to at least one of the aft weed deflectors 112, or which does not pivot relative to the second ends 154 of the weed deflectors 112. A portion of the aft weed deflector 112 is retracted into the hull 82; collapsed, telescopically or otherwise; and/or otherwise shortened to accommodate upward movement of the aft hydrofoil 104, which decreases the distance between the lifting member 120 and the connection point between the hull 82 and the first end 152 of the aft weed deflector 112.

Referring to FIG. 2, the illustrated boat 80 is configured with a retractable forward hydrofoil 102, a retractable forward weed deflector 110, and a retractable aft hydrofoil 104. Similarly to the embodiment of FIG. 1, the hydrofoils 102, 104 of FIG. 2 are configured to transition from their extended positions to their retracted positions by sliding upwards in the direction of the respective arrow(s) 218, 220. As the forward hydrofoil 102 moves from the extended position to the retracted position, the strut 122 supporting the lifting member 120 may retract upwards in the direction of arrow 218 into a recess, slot and/or other space within the hull 82 in the direction of arrows 212. Other embodiments may move the lifting member 120 upwards using a collapsible, telescoping strut and/or another mechanism for upwards movement. As the forward hydrofoil 102 moves upwards, the forward weed deflector 110 may move with the forward hydrofoil 102 by pivoting, sliding, and/or otherwise moving relative to the hull 82 in the direction of arrow 216. In the embodiment of FIG. 1, the first end 152 of the forward weed deflector 110 pivots relative to the hull 82. The forward lifting member 120 pivots relative to the second ends 154 of the weed deflectors 110 to maintain a generally horizontal orientation. Other embodiments, however, may include a forward lifting member 120 that is rigidly connected to at least one of the forward weed deflectors 110, or which does not pivot relative to the second ends 154 of the weed deflectors 110. A portion of the forward weed deflector 110 is retracted into the hull 82; collapsed, telescopically or otherwise; and/or otherwise shortened to accommodate upward movement of the forward hydrofoil 102, which decreases the distance between the lifting member 120 and the connection point between the hull 82 and the first end 152 of the forward weed deflector 110. With continued reference to FIG. 2, as the aft hydrofoil 104 moves from the extended position to the retracted position, the strut 122 supporting the lifting member 120 may retract upwards into a recess, slot and/or other space within the hull 82 in the direction of arrows 220. Other embodiments may move the lifting member 120 upwards using a collapsible, telescoping strut and/or another mechanism for upwards movement.

Referring to FIG. 3, the illustrated boat 80 is configured with a retractable forward hydrofoil 102, retractable forward weed deflectors 110, a retractable aft hydrofoil 104, and a retractable aft weed deflector 112. In the embodiment of FIG. 3, the hydrofoils 102, 104 transition from their extended positions to their retracted positions by pivoting relative to the hull 82 in the direction of the respective arrow 222, 226. As the forward hydrofoil 102 moves from the extended position to the retracted position, the forward hydrofoil 102 pivots about the connection between the hull 82 and the first ends 152 of the forward weed deflectors 110 supporting the lifting member 120. In some embodiments, the lifting member 120 of the forward hydrofoil 102 may pivot relative to the second ends 154 of the weed deflectors 110 to maintain a generally horizontal orientation. Other embodiments, however, may include a forward lifting member 120 that is rigidly connected to at least one of the forward weed deflectors 110, or which does not pivot relative to the second ends 154 of the weed deflectors 110.

With continued reference to FIG. 3, the aft hydrofoil 104 is configured to move from the extended position to the retracted position by pivoting relative to the hull 82. As the aft hydrofoil 104 moves from the extended position to the retracted position, the aft hydrofoil 104 pivots about the connection between the hull 82 and the first end 126 of strut 122 which supports the lifting member 120. In the illustrated embodiment, the first end 152 of the aft weed deflector 112 slides upwards into the hull 82 of the boat 80 along a curved path and in the direction of arrow 224. Some embodiments may be configured with an aft weed deflector 112 that is collapsible and/or otherwise shortenable to accommodate upward movement of the aft hydrofoil 104 as the distance between the lifting member 120 and the connection point between the hull 82 and the aft weed deflector 112 decreases. In some embodiments, the lifting member 120 of the forward hydrofoil 102 may pivot relative to the second ends 126, 154 of the strut 122 and the weed deflector 112 to maintain a generally horizontal orientation. Other embodiments, however, may include an aft lifting member 120 that is rigidly connected to at least one of the aft weed deflectors 112 and/or the strut 122, or which does not pivot relative to the second ends 154 of the aft weed deflectors 112.

Referring to FIG. 4, the illustrated boat 80 is configured with a retractable midship hydrofoil 106 and corresponding retractable midship weed deflectors 114. As the midship hydrofoil 106 moves from the extended position to the retracted position, the lifting member 120 generally moves in an upward direction as the midship weed deflectors 114 and the supporting struts 122 slide and/or pivot relative to the hull 82 in the direction of the corresponding arrow 228, 230. In particular, the midship weed deflectors 114 pivot about the connection between hull 82 and the first end 152 of the weed deflectors 114 in the direction of arrow 228 and the supporting struts 122 pivot in the direction of arrow 230 about the connections between the hull 82 and the first ends 126 of the struts 122. The combined pivoting movement of the midship weed deflectors 114 and the struts 122 allows the lifting member 120 to translate in the upward axial direction AX without substantial horizontal movement. Other embodiments may be configured such that there is horizontal movement of the lifting member 120 as the midship hydrofoil 106 moves into and between the extended position and the retracted position. In the illustrated embodiment, the lifting member 120 is configured to pivot relative to the second ends 128, 154 of the struts 122 and the midship weed deflectors 114 to maintain a horizontal orientation of the lifting member 120. Some embodiments, however, may be configured with a lifting member 120 that does not pivot relative to the second end 128, 154 of at least one of the struts 122 and/or midship weed deflectors 114.

FIG. 5 illustrates an embodiment of a boat 80 including a retractable midship hydrofoil 106 with corresponding retractable midship weed deflectors 114. Similarly to the forward hydrofoil 102 of FIG. 3, the midship hydrofoil 106 of FIG. 5 is configured to move into the retracted position by pivoting relative to the hull 82. As the midship hydrofoil 106 moves from the extended position to the retracted position, the lifting member 120 of the midship hydrofoil 106 pivots in the direction of arrow 232 about the connection between the hull 82 and the first ends 152 of the midship weed deflectors 114 that support the lifting member 120. In some embodiments, the lifting member 120 of the midship hydrofoil 106 may pivot relative to the second ends 154 of the weed deflectors 114 to maintain a generally horizontal orientation. Other embodiments, however, may include a midship lifting member 120 that is rigidly connected to at least one of the midship weed deflectors 114 or which does not pivot relative to the second ends 154 of the midship weed deflectors 114.

FIG. 6 illustrates an embodiment of a boat 80 including a retractable aft hydrofoil 104 and a retractable aft weed deflector 112. In the illustrated embodiment, the aft hydrofoil 104 moves from the extended position to the retracted position by sliding towards the hull 82 in the direction of arrow 234. As the aft hydrofoil 104 moves from the extended position to the retracted position, the aft weed deflector 112 that supports the lifting member 120 may retract upwards into a recess, slot and/or other space within the hull 82 in the direction of arrows 234. Other embodiments may move the lifting member 120 upwards using a collapsible, telescoping aft weed deflector and/or another mechanism for upwards movement.

Figure 7:
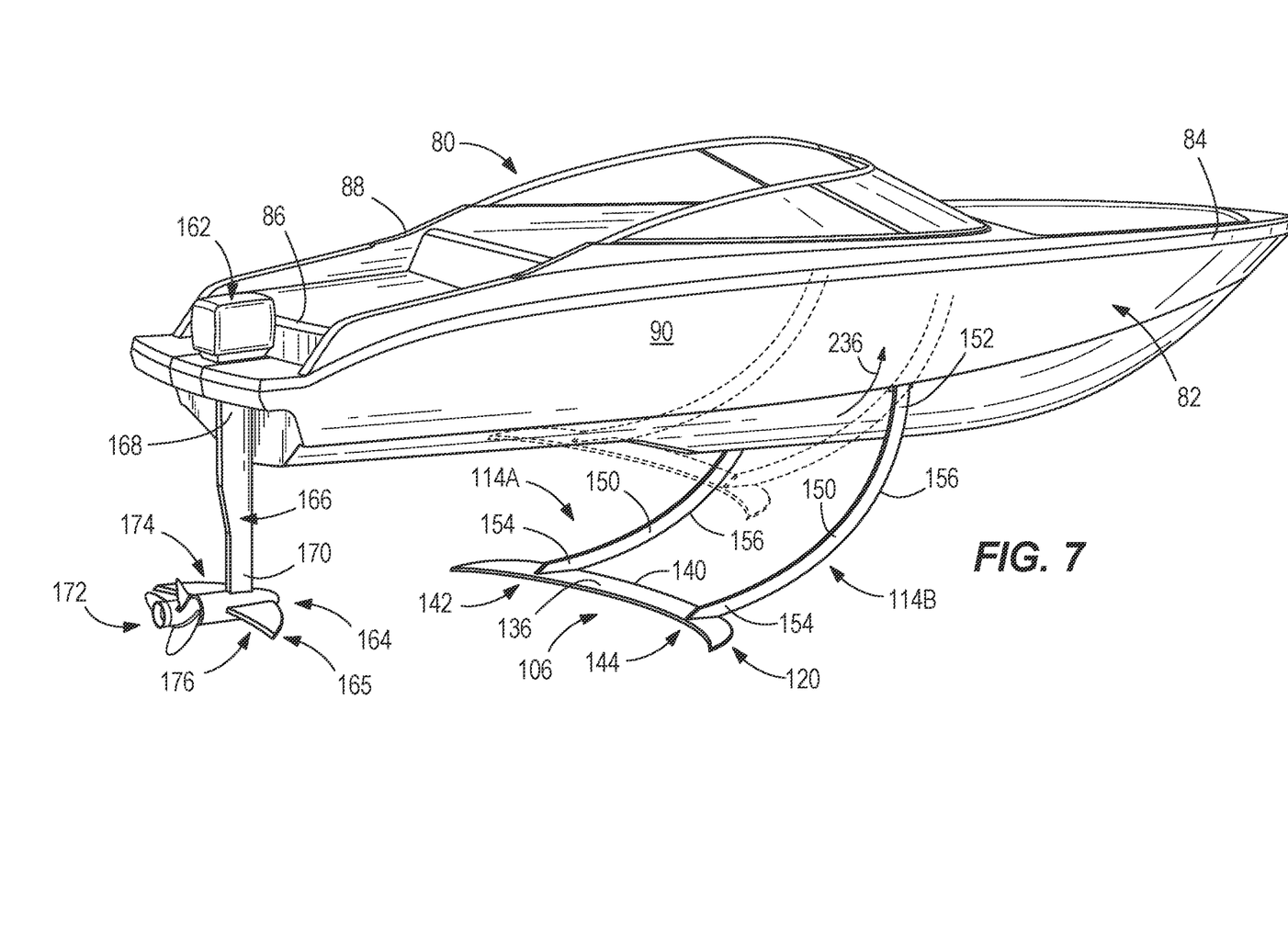
FIG. 7 is a perspective view of a boat having a seventh embodiment of a weedless hydrofoil apparatus.
Figure 8:
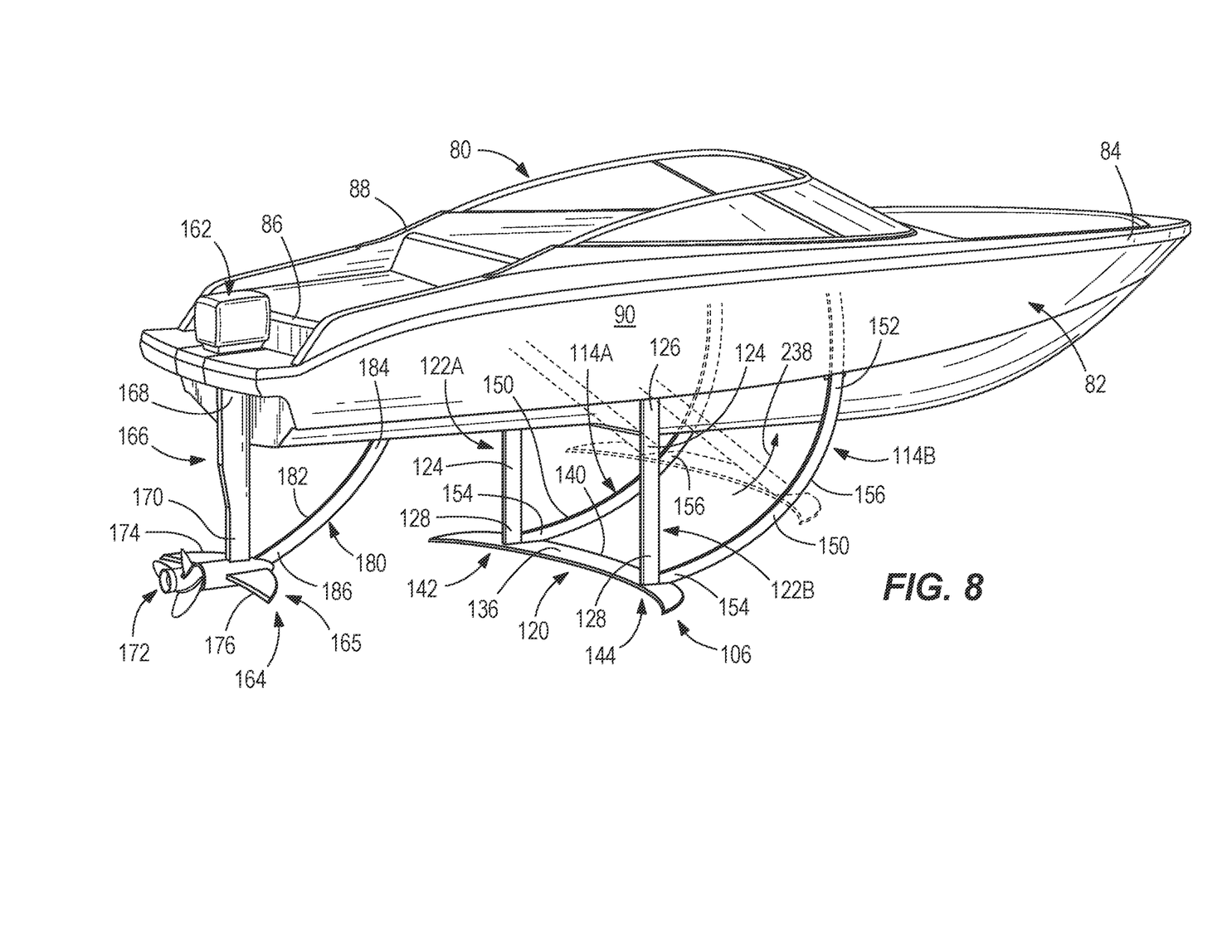
FIG. 8 is a perspective view of a boat having an eighth embodiment of a weedless hydrofoil apparatus.

FIG. 7 illustrates an embodiment of a boat 80 including a retractable midship hydrofoil 106 and retractable midship weed deflectors 114. Similarly to the aft hydrofoil 104 of FIG. 6, the midship hydrofoil 106 of FIG. 7 moves from the extended position to the retracted position by sliding towards the hull 82 in the direction of arrow 236. As the midship hydrofoil 106 moves upwards from the extended position to the retracted position, the midship weed deflectors 114 supporting the lifting member 120 may retract upwards into a recess, slot and/or other space within the hull 82 in the direction of arrows 236. Other embodiments may move the lifting member 120 upwards using collapsible, telescoping weed deflectors and/or another mechanism for upwards movement.

FIG. 8. illustrates an embodiment of a boat 80 including a retractable midship hydrofoil 106 and retractable midship weed deflectors 114. In the embodiment of FIG. 8, the midship hydrofoil 106 is configured to pivot upwards towards the hull 82 in the direction of arrow 238. Specifically, the midship hydrofoil 106 pivots about the connection between the hull 82 and the first ends 126 of the struts 122. The lifting member 120 of the midship hydrofoil 106 may also pivot relative to the second ends 126 of the struts 122 to maintain a generally horizontal orientation of the lifting member. Some embodiments, however, may include a midship lifting member 120 that is rigidly connected to at least one of the strut 122, or which does not pivot relative to the second ends 126 of the struts 122. As the midship hydrofoil 106 moves into the retracted position, the first ends 152 of the midship weed deflectors 114 slide along a curved path in the direction of arrow 238 into a recess, slot, or other cavity in the hull 82 of the boat 80. Some embodiments may be configured with a midship weed deflector 114 that is collapsible and/or otherwise shortenable to accommodate upward movement of the midship hydrofoil 106 as the distance between the lifting member 120 and the connection point between the hull 82 and the midship weed deflectors 114 decreases.

FIG. 9 illustrates an embodiment of a boat 80 including retractable port and starboard midship hydrofoils 106A. 106B that are respectively supported by retractable port and starboard midship weed deflectors 114A, 114B. Similarly to the midship hydrofoil 106 of FIG. 5, the midship hydrofoils 106 of FIG. 9 move from the extended position to the retracted position by pivoting relative to the hull 82 in the direction of arrow 240. As the midship hydrofoils 106 move from the extended position to the retracted position, the lifting members 120 pivot in the direction of arrow 240 about the connection between the hull 82 and the first ends 152 of the midship weed deflectors 114. In some embodiments, the lifting members 120 of the midship hydrofoil 106 may pivot relative to the second ends 154 of the midship weed deflectors 114 to maintain a generally horizontal orientation. Other embodiments, however, may include a midship lifting member 120 that is rigidly connected to at least one of the midship weed deflectors 114, or which does not pivot relative to the second ends 154 of the weed deflectors 114.

FIG. 10 illustrates an embodiment of a boat 80 including a retractable forward hydrofoil 102, retractable forward weed deflectors 110, and a retractable propulsor weed deflector 180. The hydrofoil 102 is configured to transition from the extended position to the retracted position by sliding upwards in the direction of the arrows 244. As the forward hydrofoil 102 moves upwards, the struts 122 supporting the lifting member 120 may retract upwards into a recess, slot and/or other space within the hull 82 in the direction of arrows 212. Other embodiments may move the lifting member 120 upwards using a collapsible, telescoping strut and/or another mechanism for upwards movement of the lifting member 120. The forward weed deflectors 110 and the propulsor weed deflector 180 are each configured to move between the extended and retracted position by pivoting relative to the hull 82. The two forward weed deflectors 110 pivot in the direction of arrow 242 about the connection between the hull 82 and the first ends 126 of the forward weed deflectors 110. The propulsor weed deflector 180 moves to the retracted position by pivoting in the direction of arrow 246 about the connection between the hull 82 and the first end 184 of the propulsor weed deflector 180. In the illustrated embodiment, the forward weed deflectors 110 and the propulsor weed deflector 180 rotate in opposite directions towards each other and the midship of the boat 80. Some embodiments, however, may be configured with forward weed deflectors 110 and a propulsor weed deflector 180 that pivot away from each other. Further still, some embodiments of a boat 80, such as those illustrated in FIGS. 1-10, may be configured with at least one hydrofoils 102, 104, 106 and/or weed deflector 110, 112, 114, 180 that pivots and/or moves in an opposite direction than those of the illustrated embodiments.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A boat for operation in water, the boat comprising:
a hull longitudinally extending between a bow and a stern and laterally extending between a port side and a starboard side,
a hydrofoil suspended from the hull, wherein as the boat moves through the water the hydrofoil is configured to create a lifting force for lifting the hull upwardly out of the water, and
a weed deflector located between the hydrofoil and the bow, wherein the weed deflector is configured to deflect weeds away from the hydrofoil.

2. The boat according to claim 1, wherein the hydrofoil comprises a lifting member configured to create the lifting force, the lifting member having a port wing which laterally extends relative to the port side of the hull and a starboard wing which is opposite the port wing and which laterally extends relative to the starboard side of the hull.

3. The boat according to claim 2, wherein the lifting member comprises a forward edge which is curved from the port wing to the starboard wing.

4. The boat according to claim 2, wherein the lifting member comprises a forward edge which is straight from the port wing to the starboard wing.

5. The boat according to claim 2, wherein the weed deflector has a first end coupled to the bow, a second end which is opposite the first end, and a body which extends downwardly from the hull towards the lifting member.

6. The boat according to claim 5, wherein the weed deflector is a first weed deflector, and further comprising a second weed deflector located between the hydrofoil and the bow, wherein the second weed deflector is configured to deflect weeds away from the hydrofoil, and further wherein the second weed deflector has a first end coupled to the bow, a second end which is opposite the first end, and a body which extends downwardly from the hull towards the lifting member.

7. The boat according to claim 5, wherein the body is a straight member extending from the first end to the second end.

8. The boat according to claim 7, wherein the second end is coupled to the lifting member.

9. The boat according to claim 7, wherein the second end is separate from the lifting member.

10. The boat according to claim 5, wherein the body is a curved member extending downwardly from the hull and then rearwardly to the second end.

11. The boat according to claim 10, wherein the second end is coupled to the lifting member.

12. The boat according to claim 10, wherein the second end is separate from the lifting member.

13. The boat according to claim 2, wherein the hydrofoil further comprises a strut which couples the lifting member to the hull.

14. The boat according to claim 13, wherein the weed deflector has a first end coupled to the bow, a second end which is opposite the first end, and a body which extends downwardly from the hull towards the lifting member.

15. The boat according to claim 14, wherein the second end of the weed deflector is coupled to a forward edge of the lifting member.

16. The boat according to claim 14, wherein the second end of the weed deflector is coupled to the strut above the lifting member.

17. The boat according to claim 16, wherein the second end of the weed deflector is coupled to a bottom surface of the lifting member.

18. The boat according to claim 13, wherein the strut has a first end coupled to the hull, a second end which is opposite the first end and is coupled to the lifting member, and a body which extends from the first end to the second end.

19. The boat according to claim 18, wherein the strut is a first strut, and further comprising a second strut having a first end coupled to the hull, a second end which is opposite the first end and is coupled to the lifting member, and a body which extends from the first end to the second end.

20. The boat according to claim 18, further comprising a propulsor coupled to the second end of the strut.

21. The boat according to claim 1, wherein the hydrofoil is movable relative to the hull into and between an extended position and a retracted position.

22. The boat according to claim 1, wherein the weed deflector is movable relative to the hull into and between an extended position and a retracted position.

23. The boat according to claim 2, wherein the weed deflector is between the hydrofoil and the bow.

24. The boat according to claim 2, wherein the weed deflector is between the port wing and the starboard wing.

* * * * *